July 31, 1945.  C. HOLLERITH  2,380,649
WHEEL RIM FLANGE AND FAIRING ASSEMBLY
Filed June 17, 1943
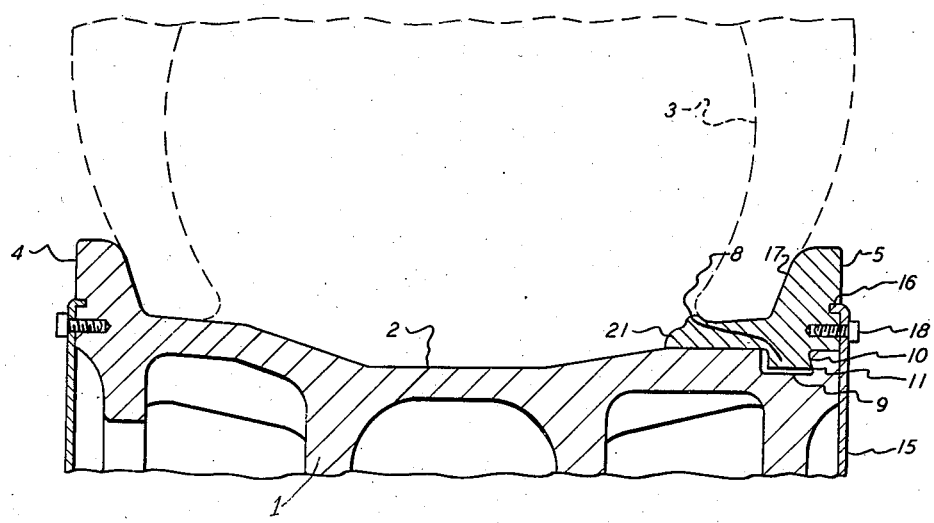
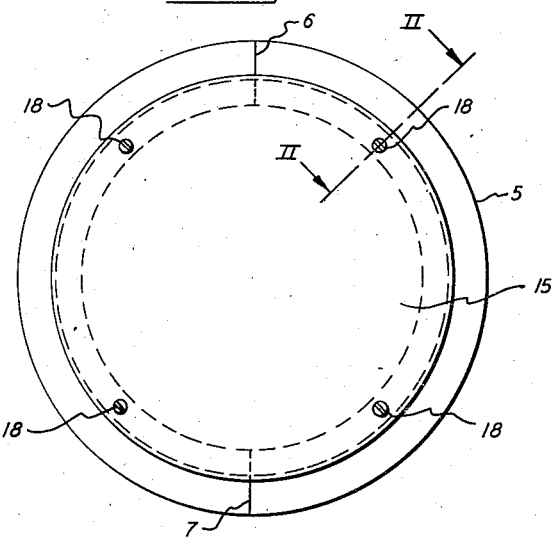
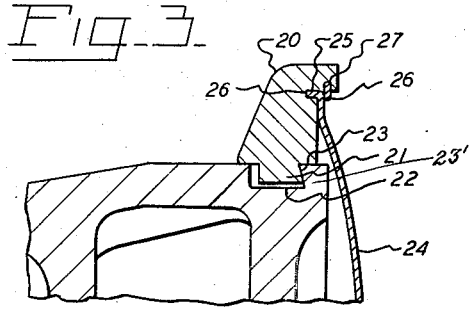
Inventor
CHARLES HOLLERITH
By Beaman & Langford
Attorneys Patented July 31, 1945

2,380,649

UNITED STATES PATENT OFFICE 2,380,649

WHEEL RIM FLANGE AND FAIRING ASSEMBLY

Charles Hollerith, Jackson, Mich., assignor to Hayes Industries, Inc., Jackson, Mich., a corporation of Michigan Application June 17, 1943, Serial No. 491,178

4 Claims. (Cl. 152—406)

The present invention relates to wheels and more particularly to tire retaining flanges for wheels for supporting pneumatic tires.

While the present invention is more particularly suited to wheels for supporting airplane tires, it is not considered to be limited to this extent. It has been heretofore proposed to provide one tire retaining flange of a tire supporting rim in such a manner as to be seated in a groove in the rim and maintained against removal from the groove by the outward pressure of an inflated tire. Such flanges were split to facilitate placing them in the rim groove. A tire retaining flange of the character described is somewhat difficult to assemble on a rim even when having a split therein due to its rigidity. Furthermore, there is nothing positive to hold the flange in place.

An object of the present invention is to provide a removable rim flange in combination with a wheel fairing which is secured to the rim.

Another object of the invention is to provide a removable rim flange having a tailpiece in interlocking co-operation with a groove in the rim in combination with a fairing secured thereto.

These and other objects residing in the arrangement, combination and construction of parts will be apparent from the following specification when taken with the accompanying drawing, in which Fig. 1 is a side elevation of a wheel showing the removable tire retaining flange according to the present invention and associated with a fairing, Fig. 2 is a section on the line II—II of Fig. 1, and Fig. 3 is a partial section corresponding to Fig. 1 showing another form of rim flange and fairing connection therewith.

Referring particularly to the drawing, the reference character 1 indicates a wheel body having a rim 2 for supporting a tire 3 shown in dotted outline. At one side of the rim 2 is an integral tire retaining flange 4 and at the other side of the rim 2 is a removable tire retaining flange 5 according to the present invention. The flange 5 is split into two parts at splits 6 and 7, shown particularly in Fig. 1.

The flange 5 is provided with a tailpiece 8 which is annular in configuration and is disposed in an annular groove 9 in the rim 2. The tailpiece 8 is provided with an outwardly inclined surface 10 which is adjacent and complementary to a corresponding surface 11 constituting one side of the annular groove 9. When the tire 3 on the rim 2 is inflated, it exerts an outward force against the rim flanges 4 and 5 urging the surfaces 10 and 11 together. The inclination of the surfaces 10 and 11 causes the same to prevent the outward movement of the flange 5 with respect to the rim 2.

There is provided a fairing 15 associated with the rim 2. The fairing 15 is of some conventional form and is provided at the periphery thereof with a tongue 16. The tongue 16 is inwardly directed and is seated in a groove 17 in the tire retaining flange 5. A plurality of screws 18 are provided for securing the fairing 15 to the flange 5.

The operation of the construction according to the present invention is as follows: The removable flange 5 is designed particularly for permitting removal thereof and thus the easy removal of the tire 3 from the rim 2. When it is desired to remove a tire 3, the fairing 15 is removed by removing the screws 18 with the tire 3 deflated. It will be a simple matter to push the two halves of the flange 5 inwardly and to radially move them away from the rim 2. The tire 3 may then be readily removed. To reassemble the rim 2 the reverse process is all that is necessary. It will be readily apparent that the tongue 16 in the groove 17, held therein by the screws 18, results in preventing outward movement of the parts of the rim flange and therefore displacement thereof with respect to the rim 2, even though the tire be deflated and the wheel run on the deflated tire.

Another form of the invention is disclosed in Fig. 3. In this form of the invention, the specific form of the tire retaining flange 20 corresponding to the flange 5 of Fig. 1 is somewhat different in that it does not have the inward extension 21 disclosed in Fig. 1 on which the tire 3 seats. However, the tailpiece 21, the groove 22 on which it seats and the complementary surfaces 23 and 23' on the tailpiece 21 and groove 22, respectively, are the same as the corresponding parts in Fig. 1.

In Fig. 3, however, the method of securing the fairing 24 to the flange 20 is somewhat different. The fairing 24 is provided with a tongue 25 which is seated in a groove 26 in the flange 20. Instead of employing a bolt to secure the fairing 24 to the flange 20, the fairing 24 is secured to the flange 20 by means of a spring ring 26 disposed in an annular groove 27. However, the result is the same in that the fairing 24 is secured to the flange 20.

It will be apparent from the foregoing specification that the removable flange according to the present invention is not only maintained in assembled relation with the rim 2 by the integral shape of the tailpiece thereof, but is also secured thereto by the connection with the fairing. This connection is of considerable importance in that it prevents the accidental displacement of the removable tire retaining flange from the wheel under emergency circumstances which would throw the conventional removable flange from the rim and permit the tire to fall off.

Having thus described my invention, what I desire to secure by Letters Patent and claim is:

1. In combination with a tire carrying rim, an annular tire retaining flange at one side of said rim, an annular tire retaining flange at the other side of said rim, said second flange being transversely split into a plurality of parts, said rim having an annular radial groove adjacent the last named side thereof, a tailpiece on said second flange seating in said groove, a wheel fairing associated with said rim and extending between said second flange parts as a structural member, and means securing said fairing to each of said second flange parts whereby removal of the parts of said second flange from said groove by radial movement is prevented.

2. In combination with a tire carrying rim, an annular tire retaining flange at one side of said rim, an annular tire retaining flange at the other side of said rim, said rim being arranged so that an inflated tire on said rim exerts an outward pressure on said rim, said second flange being transversely split into a plurality of parts, said rim having an annular groove adjacent the last named side thereof, said second flange having an annular tailpiece disposed in said groove, said tailpiece having a surface which is outwardly and radially inwardly inclined, said groove having a surface adjacent and complementary to said inclined tailpiece surface whereby outward movement of said second flange moves said surfaces together in restrained outward movement of said second flange with respect to said rim, a wheel fairing associated with said rim, said second flange having an annular groove therein, said fairing having an annular tongue disposed in said groove, and means to hold said tongue in said groove whereby removal of the parts of said second flange from said rim is prevented.

3. In combination with a tire carrying rim, an annular tire retaining flange at one side of said rim, an annular tire retaining flange at the other side of said rim, said second flange being transversely split into two parts, said rim having an annular radial groove adjacent the last named side thereof, a part of said second flange seating in said groove, a wheel fairing associated with said rim and extending between said parts, and means securing said fairing to each of said second flange parts, whereby removal of the parts of said second flange from said groove by radial movement is prevented.

4. In combination with a tire carrying rim, an annular tire retaining flange at one side of said rim, an annular tire retaining flange at the other side of said rim, said rim being arranged so that an inflated tire on said rim exerts an outward pressure on said rim, said second flange being transversely split into a plurality of parts, said rim having an annular radial groove adjacent the last named side thereof, said second flange having an annular part disposed in said groove, said part having a surface which is outwardly and radially inwardly inclined, said groove having a surface adjacent and complementary to said inclined surface whereby outward movement of said second flange moves said surfaces together in restrained outward movement of said second flange with respect to said rim, a wheel fairing associated with said rim and extending between said split flange parts, and means securing said fairing to each of said second flanged parts whereby removal of said second flange from said rim is prevented.

CHARLES HOLLERITH.